Nov. 27, 1928.

F. W. BAKER 1,693,360

VEHICLE WHEEL

Original Filed Feb. 2, 1920

Inventor-
Frederick William Baker,
By- B. Singer, Atty.

Patented Nov. 27, 1928.

1,693,360

UNITED STATES PATENT OFFICE.

FREDERICK W. BAKER, OF OLDSWINFORD, STOURBRIDGE, ENGLAND, ASSIGNOR TO TRINITY WHEEL CORPORATION, A CORPORATION OF NEW YORK.

VEHICLE WHEEL.

Application filed February 2, 1920, Serial No. 355,631, and in Great Britain December 10, 1919. Renewed September 15, 1925.

This invention relates to improvements in spring wheels for automobiles and other vehicles, for which I have been granted British Patent No. 130,719, the sealing date of which is December 10, 1919, the object of the invention being to provide an improved wheel which is extremely strong and durable, is light, and in which the spoke members are so arranged that they both carry the load and afford lateral stability.

With the above and other objects in view, the invention consists in the construction, combination and arrangement of devices hereinafter described and claimed.

In the accompanying drawings:—

Figure 2:
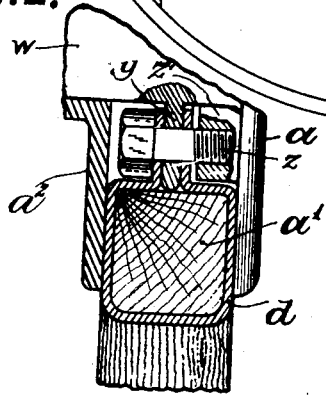
Figure 2 is a detail sectional view of the same taken on the plane indicated by the line $x$—$x$ of Figure 1.

The hub or centre $w$ of the wheel is here shown as constructed with an integral disk plate $a$ and with a removable disk plate $a^2$. The integral plate has lugs $z'$ integral therewith, and $b$ is the steel rim. The spoking system comprises, in accordance with my invention, a series of three arched or curved members as shown having a radius that is the same or approximately the same, as that of the rim. These arched members are disposed with their concaved sides outwards or presented to the inner periphery of the rim or felloe and their ends or extremities are directly buttressed upon and secured either by sockets $c$ as shown or in any other convenient manner to the said rim or felloe. The convexed sides of the crowns or middle portions $a'$ of the said arched members are received equidistantly and are secured or anchored to the hub or centre of the wheel, these hub connections being made either by clips or straps $d$ as in the illustrated example, or by any appropriate mechanical or other fixing devices or method. The hub centre $w$ is also provided with radial lugs $y$ to which the ends of the lips are secured by bolts $z$. Said bolts engage threaded openings in the lugs $z'$, as shown in Figure 2.

Figure 1:
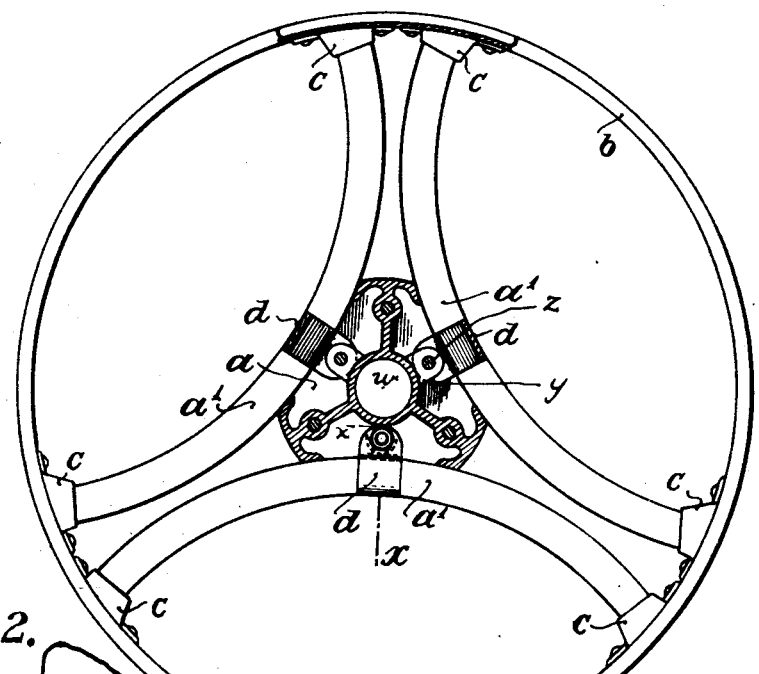
Figure 1 is an elevation, partly in section, of a wheel constructed in accordance with my invention.

The arched spoke members (which are counterparts of one another and interchangeable) are comparatively rigid and may be made from wood or metal tubing, or from troughed, channelled, or other section metal, and by arrangement and disposition of such a trinity of spoking arches between the wheel centre and circumference in the manner shown in Figure 1, there are produced three groups of twin curved spoke-arms in which (in the case of a centrally-driven wheel) each individual arm functions successively and alternately as a tension member and as a compression member for transmitting or conveying the drive from centre to periphery, whereas by virtue of the curved formation of the arms and the manner in which they are grouped, there is no spoke ever acting in direct radial compression and thus all possibility of the elasticity or resilience of the structure being neutralized by the internal spoking is eliminated. That is to say, whichever way a wheel is turning, each individual spoke-arm, on beginning to take the drive, first acts in tension to transmit the drive under a tangentially-exerted pull, applied or exerted from the leading point of connection between the hub and the spoke element and then (on passing over the wheel centre) comes under compression and continues the transmission of the drive by a tangentially-exerted thrust or push.

Moreover, with a triple-arched construction such as is now being described, the twin spoke groups are equidistantly disposed at an angular separation approximating to 120 degrees so that there are correspondingly wide sectors or arcs in the rim or wheel circumference which are not directly connected to the spokes and whose normal resilience is not neutralized or deadened by the spoking system, wherefrom it results that those sectors of the circumference are free to function naturally for taking up or absorbing the road or drive shocks to which the wheel is subjected. That is to say, in all positions of the wheel relative to the road, the natural or inherent resilience of the rim can be used to the maximum advantage for cushioning the drive and by reducing the unsprung weight, since when one of the rim sectors that intervene between the pairs of spoke connnections is in contact with the ground, that particular sector itself yields or gives to absorb road and drive shock, whilst at the instance when either of those parts of the rim to which the spokes are attached is in contact with the ground, shock absorbing action of the rim is not deadened or even momentarily neutralized, since the free wheel rim sector which is then at the top of the wheel and directly over the spoke connecting portion that is making road contact, provides for the carrying of the axle load practically in spring suspension from such upper part of the rim, which is also free to function for cushioning the drive or for absorbing drive and like shocks.

Figure 3:
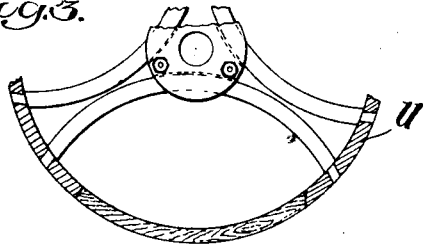
Figure 3 is an elevation, partly in section, showing a modified construction of my improved wheel.

A similar form of wheel in which three continuous wood spoke members are used is shown in Figure 3. In this construction, the crowns of the arches are seated into concaved formations around the hub and may be fixed or anchored therein in any convenient manner, whilst the ends of the spoke arms are connected into the wooden felloe U in the manner shown in section in the said figure.

From the foregoing description it will be noticed that I provide a spoke system for a wheel which is in effect a three armed spider, with the arms representing arches back to back, and with the arches preferably of substantially the same radius as the wheel rim. Further, that as this spider has its arms connected to the rim at equidistant points substantially 120 degrees apart, I get very important results, to wit, the natural resiliency of the rim is in a great measure retained without deformation thereof, because while the spider arms are attached to the rim at only three points, the flattening tendency can only extend to the nearest points of attachment; any stress or strain arising at one arm of the spider is distributed to the other two arms and rim, and because none of the arms is diametrically opposite any other, the distribution of strain is perfect, and the wheel is exceptionally strong for its weight. As another advantage it follows that as the major portion of the wheel is free or devoid of spokes, the wheel is comparatively easy to make and easy to keep clean.

Having described my invention, what I claim and desire to secure by Letters Patent is:—

1. A wheel comprising a hub, a resilient rim, and three arcuate comparatively rigid spokes of substantially the same radius as the rim arranged to constitute a symmetrical system of arches, the ends of each spoke being buttressed directly into the rim at points approximately 120 degrees apart, and the center of each spoke being seated around the hub and said spokes being arranged with their concave sides toward the rim.

2. In a vehicle wheel, a rim and a plurality of arched spokes, each rigid throughout with its ends terminating at the rim, the spokes being spaced apart with their arches confronting each other.

3. In a vehicle wheel, a rim, a plurality of arched spokes, each rigid throughout with its ends terminating at the rim, the spokes being spaced apart with their arches confronting each other, and means rigidly securing the ends of the spokes to the rim.

Signed at Birmingham, England, this 23rd day of December, A. D. 1919.

FREDERICK W. BAKER.